(12) United States Patent
Bickel et al.

(10) Patent No.: US 9,703,897 B2
(45) Date of Patent: Jul. 11, 2017

(54) MODULAR DESIGN OF COMPLEX TENSEGRITY STRUCTURES

(71) Applicant: Disney Enterprises, Inc., Burbank, CA (US)

(72) Inventors: Bernd Bickel, Zürich (CH); Sandro Mani, Cavigliano (CH); Bernhard Thomaszewski, Zürich (CH); Stelian Coros, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 606 days.

(21) Appl. No.: 14/330,192

(22) Filed: Jul. 14, 2014

(65) Prior Publication Data

US 2016/0012156 A1    Jan. 14, 2016

(51) Int. Cl.
*G06F 17/50*    (2006.01)
(52) U.S. Cl.
CPC .................... *G06F 17/50* (2013.01)
(58) Field of Classification Search
CPC ....................................................... G06F 17/50
USPC ............................................................. 703/1
See application file for complete search history.

(56) References Cited

U.S. PATENT DOCUMENTS

| 4,731,962 A * | 3/1988 | Kittner ................. A63H 33/103 135/121 |
| 5,642,590 A * | 7/1997 | Skelton .................... B64G 9/00 52/641 |
| 2015/0019177 A1* | 1/2015 | Ge .......................... E04B 7/14 703/1 |
| 2015/0178411 A1* | 6/2015 | Ge .......................... E04B 7/14 703/1 |

* cited by examiner

*Primary Examiner* — Timothy A Mudrick
(74) *Attorney, Agent, or Firm* — Farjami & Farjami LLP

(57) ABSTRACT

There is provided a tensegrity design system and a method for use in designing a complex tensegrity structure. In one implementation, such a method includes providing virtual building blocks selectable by a user for assembly of a desired tensegrity structure, receive user-selected building blocks from among the plurality of virtual building blocks from the user, and identifying connections among the user-selected building blocks based on user inputs to the tensegrity design system. The method also includes determining a network of forces for stabilizing a tensegrity structure corresponding to the desired tensegrity structure, based on the user-selected building blocks and their connections, and generating a simulation of the tensegrity structure corresponding to the desired tensegrity structure for display to the user.

25 Claims, 7 Drawing Sheets

MODULAR DESIGN OF COMPLEX TENSEGRITY STRUCTURES

BACKGROUND

Due to their light weight, stability, and aesthetically pleasing appearance, tensegrity structures, also known simply as tensegrities, can be useful across a wide range of applications. For example, tensegrities can be utilized in the arts, architecture, robotics, and furniture design, in addition to other applications. The term tensegrity is a contraction of the words "tension" and "integrity," and refers to the fact that properly designed tensegrities are stable under their own weight due to the interplay of tensile and compressive forces produced by their structural elements, such as struts and cables for example.

Although, as noted above, tensegrities can have many useful applications, their conventional design presents considerable challenges, which may have contributed to their limited adoption. For example, in the most general design case in which an arbitrary target geometry is to be substantially replicated as a tensegrity, the mixed continuous-discrete optimization problems requiring solution according to conventional design approaches present, at the very least, a high processing overhead, and may in many instances prove impracticable to solve. Moreover, due to the strict topological constraints imposed on tensegrities, and the high-dimensional parameter spaces and nonlinearity of their structural forces, the difficulty in designing tensegrity structures increases rapidly with the increasing complexity of the target geometry. Thus, the burdens associated with conventional design approaches tend to discourage the use of tensegrities in general, and in cases where they are implemented, tend to limit their designs to relatively simple geometries.

SUMMARY

There are provided methods and systems for performing modular design of complex tensegrity structures, substantially as shown in and/or described in connection with at least one of the figures, and as set forth more completely in the claims.

DETAILED DESCRIPTION

Figure 1:
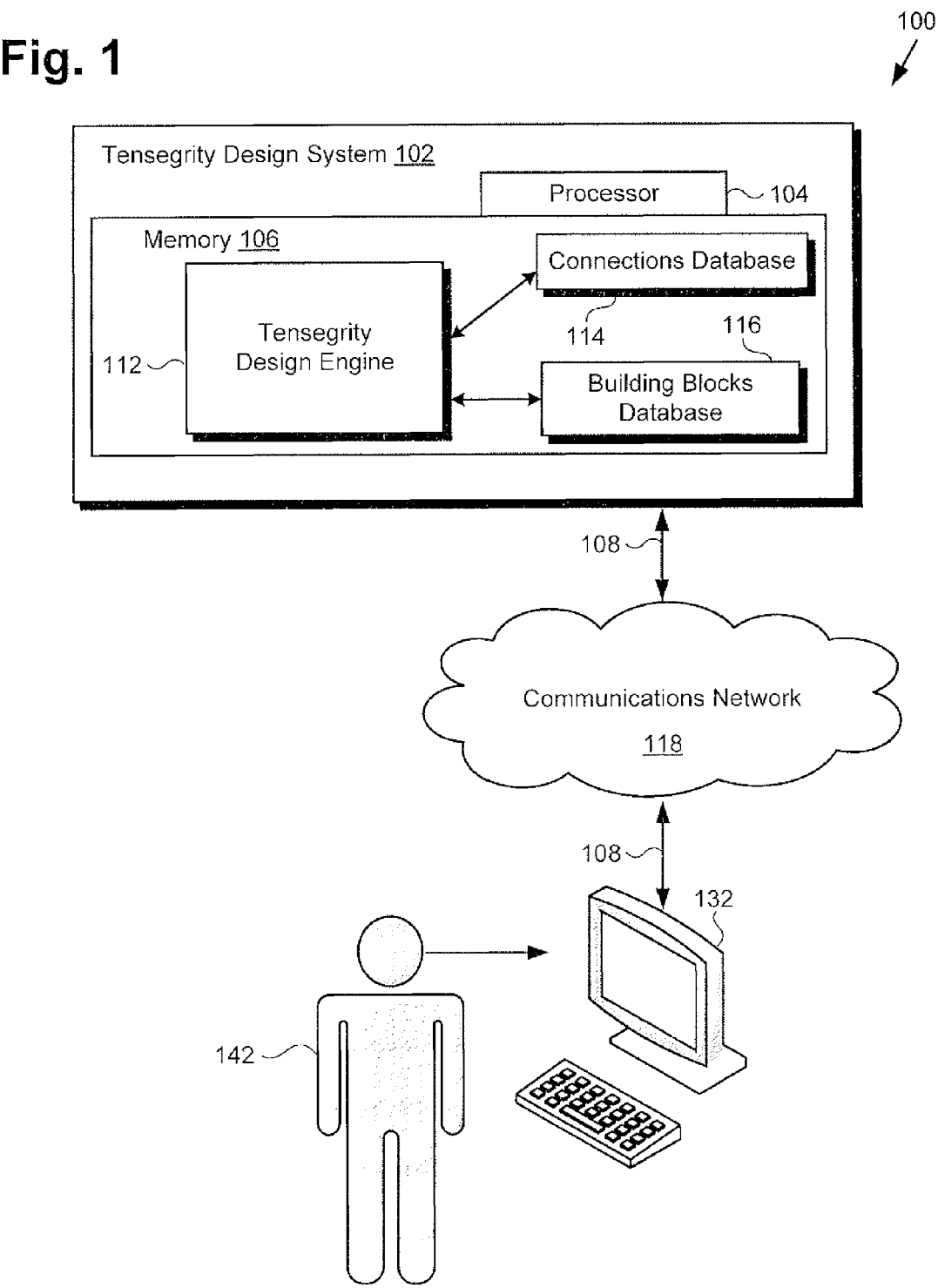
FIG. 1 shows a diagram of an exemplary tensegrity design system configured to perform modular design of complex tensegrity structures, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, although tensegrities can have many useful applications, their conventional design presents considerable challenges. For example, and as also noted above, in the most general design case in which an arbitrary target geometry is to be substantially replicated as a tensegrity, the resulting mixed continuous-discrete optimization problems requiring solution present, at the very least, a high processing overhead, and may in many instances prove impracticable to solve. As further noted, an unfortunate result of the burdens associated with conventional approaches to designing tensegrities is that even in situations where they are implemented, their design may be limited to relatively simple geometries. The present application discloses an improved design solution that adopts a modular approach to designing complex tensegrity structures. Moreover, some implementations of the present solution may enable a substantially non-expert user, such as an artist, landscape designer, or consumer, for example, to design complex tensegrity structures capable of supporting their own weight.

As used in the present application, the terms "tensegrity structure" or "tensegrity" refers to an assembly of structural elements configured to resist compressive forces as well as resistive forces, e.g., substantially rigid strut elements, in combination with structural elements configured to resist tensile forces but not compressive forces, e.g., elastic or inelastic cable elements. As noted above, the term "tensegrity" is a contraction of the words "tension" and "integrity," and refers to the fact that properly designed tensegrities are stable under their own weight due to the interplay of tensile and compressive forces produced by their structural elements, for example, struts and cables. The tensegrities referred to in the present application are under the general constraint that no two structural elements configured to resist compressive forces and tensile forces can meet at their endpoints. In implementations in which tensegrities are assembled of strut and cable elements, for example, there is no limitation on the number of cables that may connect to a strut, but no two struts may meet at their endpoints.

FIG. 1 shows a diagram of an exemplary tensegrity design system configured to perform modular design of complex tensegrity structures, according to one implementation. As shown in FIG. 1, design environment 100 includes tensegrity design system 102, communications network 118, design terminal 132, and user 142 utilizing design terminal 132. As further shown in FIG. 1, tensegrity design system 102 includes system/hardware processor 104, and system memory 106 storing connections database 114, building blocks database 116, and tensegrity design engine 112. Also shown in FIG. 1 are network communication links 108 interactively connecting design terminal 132 and tensegrity design system 102 via communications network 118.

It is noted that although FIG. 1 depicts connections database 114, building blocks database 116, and tensegrity design engine 112 as being mutually co-located in system memory 106, that representation is merely provided as an aid to conceptual clarity. More generally, tensegrity design system 102 may include one or more design servers, which may be co-located, or may form an interactively linked but distributed system. As a result, system processor 104 and system memory 106 may correspond to distributed processor and memory resources within tensegrity design system 102. Thus, it is to be understood that connections database 114, building blocks database 116, and tensegrity design engine 112 may be stored remotely from one another within the distributed memory resources of tensegrity design system 102, which may be a cloud based system, for example.

It is further noted that in some implementations, tensegrity design system 102 may not include connections database 114 and/or building blocks database 116. In those implementations, connections database 114 and/or building blocks database 116 may be external resources for tensegrity design system 102, accessible over communications network 118.

According to the implementation shown by FIG. 1, user 142 may utilize design terminal 132 to interact with tensegrity design engine 112 of tensegrity design system 102, over communications network 118. In one such implementation, tensegrity design system 102 may correspond to one or more web servers, accessible over a packet network such as the Internet, for example. Alternatively, tensegrity design system 102 may correspond to one or more design servers supporting a local area network (LAN), or included in another type of limited distribution network.

Although design terminal 132 is shown as a personal computer (PC) in FIG. 1, that representation is also provided merely as an example. In other implementations, design terminal 132 may be another type of mobile or stationary computing device or system. For example, design terminal 132 may take the form of a design kiosk in a theme park environment, a computer workstation, or may be implemented as a tablet computer, or a mobile communication device such as a smartphone, for example.

As shown in FIG. 1, tensegrity design engine 112, under the control of system processor 104, may receive one or more inputs from user 142 over communications network 118. For example, and as will be described in greater detail below, tensegrity design engine 112 may receive inputs enabling identification of building blocks and one or more connections for assembly of a complex tensegrity structure.

Tensegrity design engine 112 may be configured to provide virtual building blocks selectable by user 142 for assembly of a desired tensegrity structure, the virtual building blocks being stored in building blocks database 116. In some implementations, in addition to enabling selection of building blocks by user 142, tensegrity design engine 112 may be configured to enable user 142 to modify the respective shapes of the selected virtual building blocks and receive such modifications, for example, through modification of their dimensions. Tensegrity design engine 112 may be further configured to identify connections among user-selected virtual building blocks using two or more connection types for joining the virtual building blocks, based on one or more user inputs.

In addition, tensegrity design engine 112 may be configured to determine a network of forces required to stabilize a tensegrity structure corresponding to the desired tensegrity structure based on the user-selected virtual building blocks and the connections. For example, tensegrity design engine 112 may determine such a network of forces using an alternating optimization approach in which position and stress variables are optimized separately. It is noted that in some instances, a desired tensegrity structure specified by user inputs may not represent a tensegrity structure capable of stability under its own weight. In those cases, tensegrity design engine 112 may determine a network of forces required to stabilize a tensegrity structure deviating slightly from, but corresponding substantially to, the desired tensegrity structure specified by the user. Tensegrity design engine 112 may also be configured to generate a simulation of the tensegrity structure corresponding to the desired tensegrity structure for display to user 142.

In some implementations, the tensegrity structure corresponding to the desired tensegrity structure may be compliant. In other words, the cables or other structural elements configured to resist tensile forces but not compressive forces may have an elasticity determining the overall stiffness of the tensegrity structure. Moreover, in some implementations, the simulation generated by tensegrity design engine 112 may be interactive, and may enable user 142 to perform a virtual use of the tensegrity structure, thereby testing its stiffness or compliance. In addition, in some implementations, tensegrity design engine 112 may be configured to adjust the stiffness or compliance of the tensegrity structure based on one or more inputs from user 142 after a virtual use of the tensegrity structure through the interactive simulation.

Figure 2:
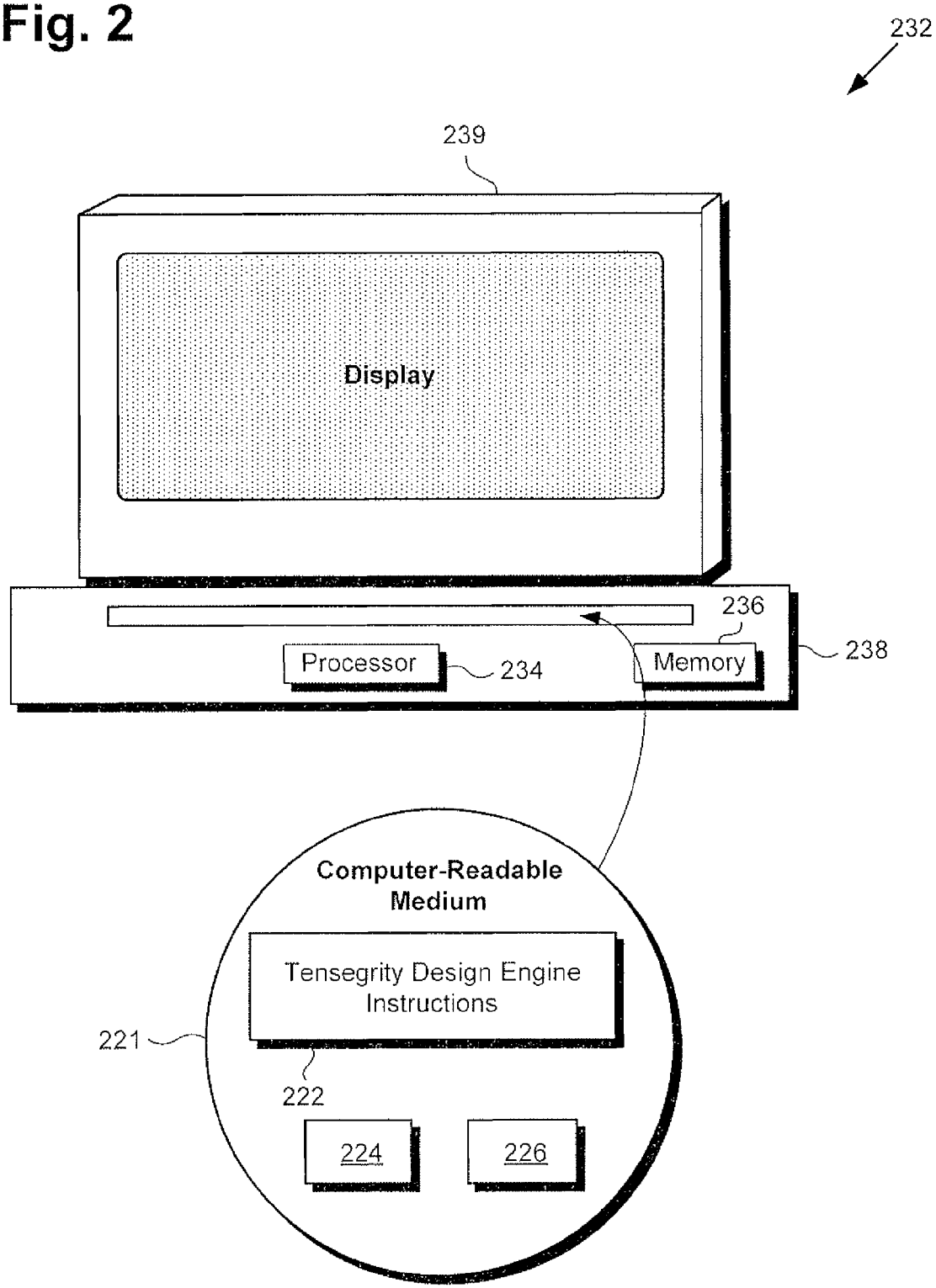
FIG. 2 shows an exemplary design terminal and a computer-readable medium including instructions enabling modular design of complex tensegrity structures, according to one implementation.

Referring now to FIG. 2, FIG. 2 shows an exemplary design terminal and a computer-readable medium including instructions enabling modular design of complex tensegrity structures, according to one implementation. Design terminal 232, in FIG. 2, includes computer 238 including hardware processor 234 and memory 236, interactively linked to display 239. Also shown in FIG. 2 is computer-readable medium 221 having connections database 224, building blocks database 226, and tensegrity design engine instructions 222 stored thereon. Design terminal 232 corresponds to design terminal 132, in FIG. 1.

The expression "computer-readable medium," as used in the present application, refers to any non-transitory medium that provides instructions to processor 234 of computer 238. Thus, a computer-readable medium may correspond to various types of non-transitory media, such as volatile media and non-volatile media, for example. Volatile media may include dynamic memory, such as dynamic random access memory (dynamic RAM), while non-volatile memory may include optical, magnetic, or electrostatic storage devices. Common forms of non-transitory computer-readable media include, for example, an optical disc, RAM, programmable read-only memory (PROM), erasable PROM (EPROM), and FLASH memory.

According to the implementation ion shown by FIG. 2, computer-readable medium 221 provides tensegrity design engine instructions 222 for execution by processor 234. Tensegrity design engine instructions 222, when executed by processor 234, instantiate a tensegrity design engine on design terminal 232 corresponding to tensegrity design engine 112, in FIG. 1, and capable of performing all of the operations attributed to tensegrity design engine 112 herein. Connections database 224 and building blocks database 226 correspond respectively to connections database 114 and building blocks database 116, in FIG. 1. It is noted that although FIG. 2 shows computer-readable medium 221 as including connections database 224 and building blocks database 226, that depiction is merely by way of an example.

In other implementations, connections database 224 and/or building blocks database 226 may not be present on computer-readable medium 221, but may be accessible to design terminal 232 over a communications network corresponding to communications network 118, in FIG. 1.

Figure 3:
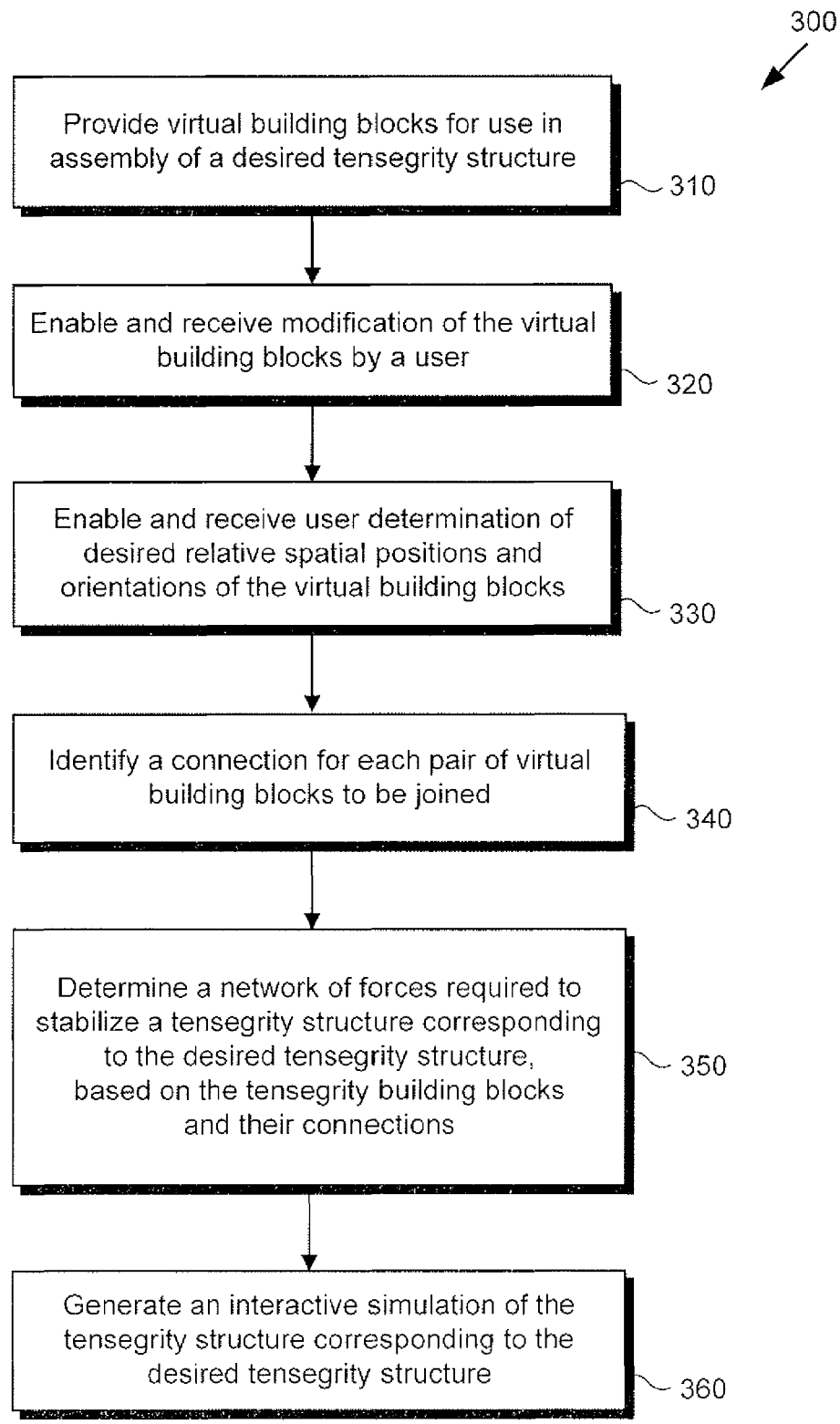
FIG. 3 is a flowchart presenting an exemplary method for use by a tensegrity design system to perform modular design of complex tensegrity structures, according to one implementation.
Figure 4A:
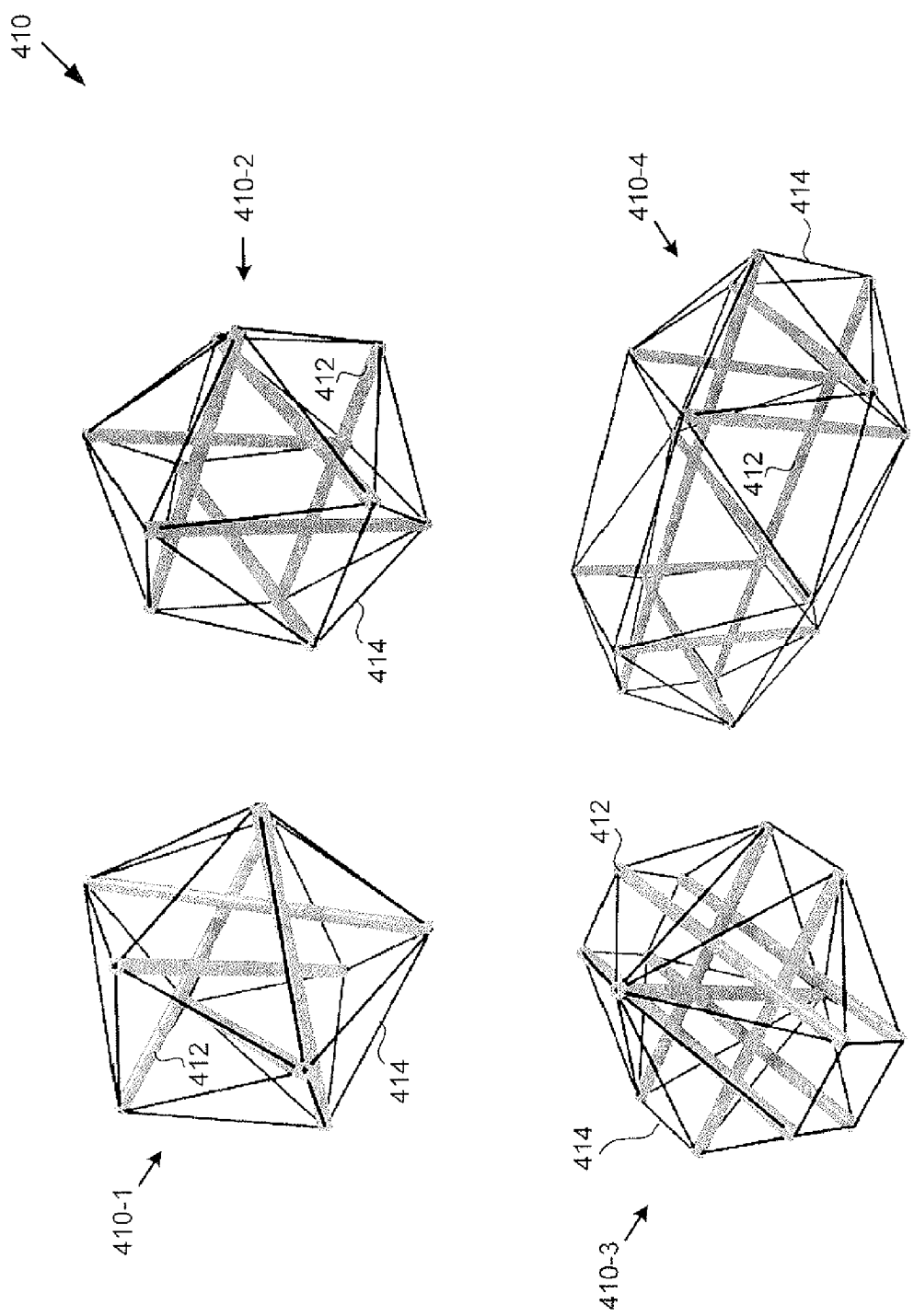
FIG. 4A shows exemplary building blocks for use in performing modular design of a complex tensegrity structure, according to one implementation.
Figure 4B:
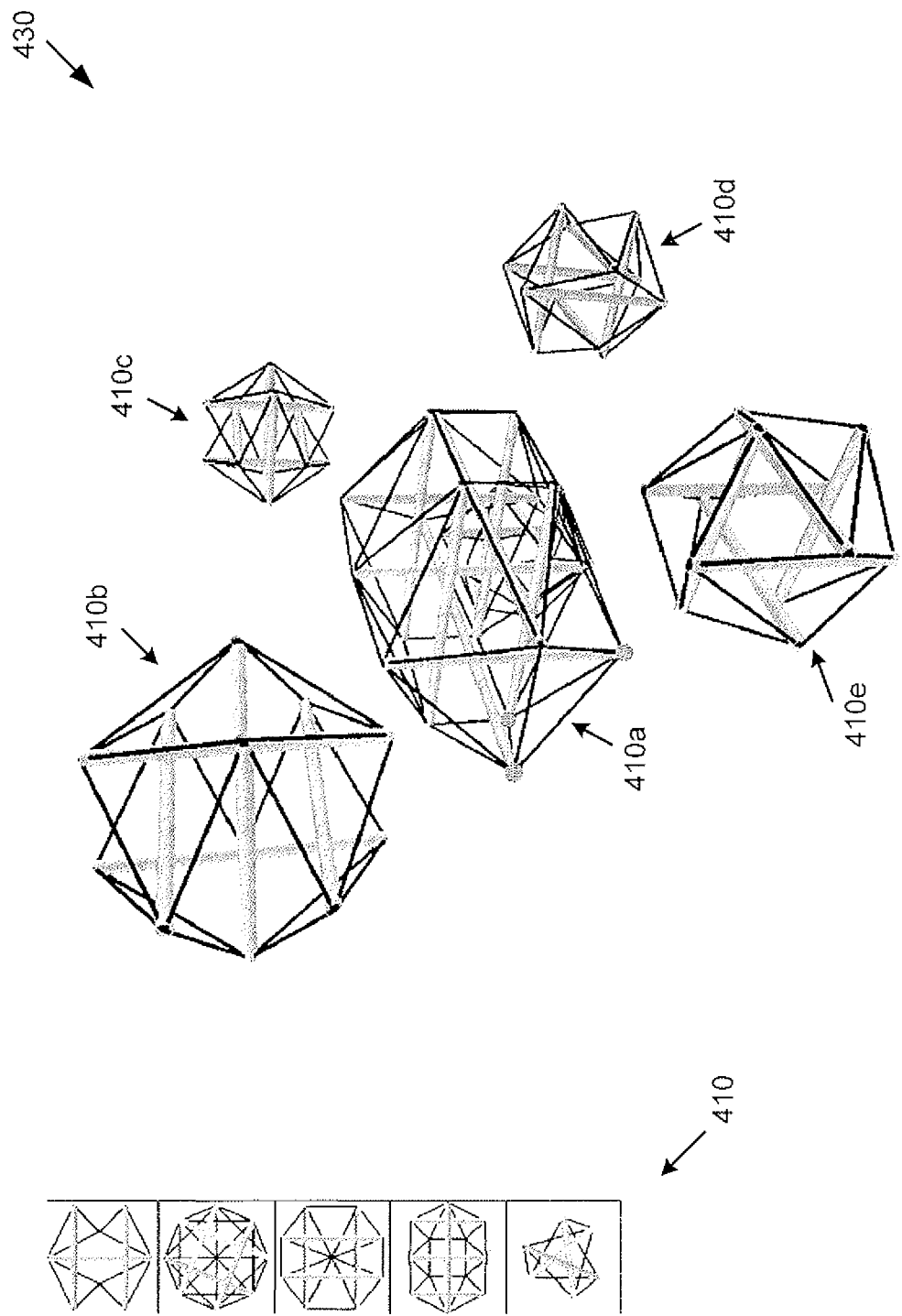
FIG. 4B depicts an intermediate stage of the exemplary method outlined in FIG. 3, according to one implementation.
Figure 4C:
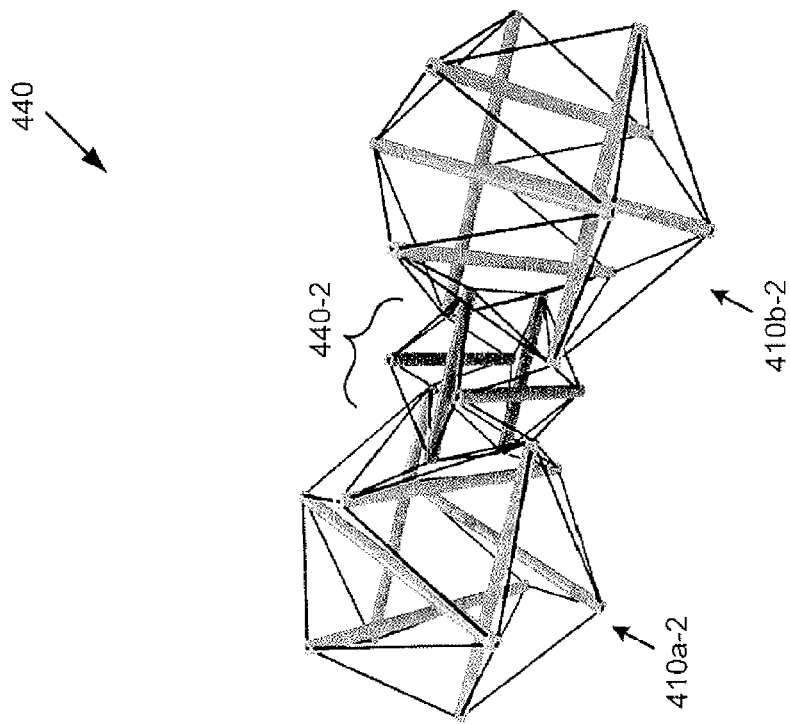
FIG. 4C shows exemplary connection types for use in joining the exemplary building blocks shown in FIG. 4A.
Figure 4C:
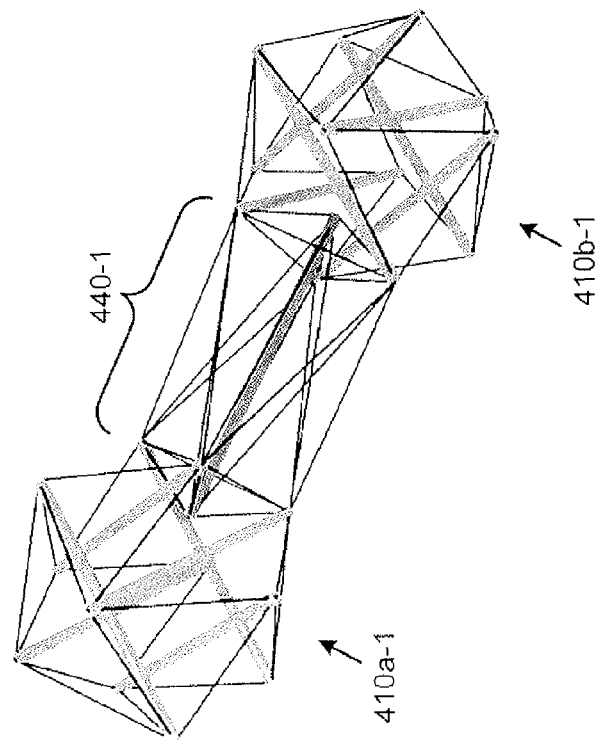
Figure 4D:
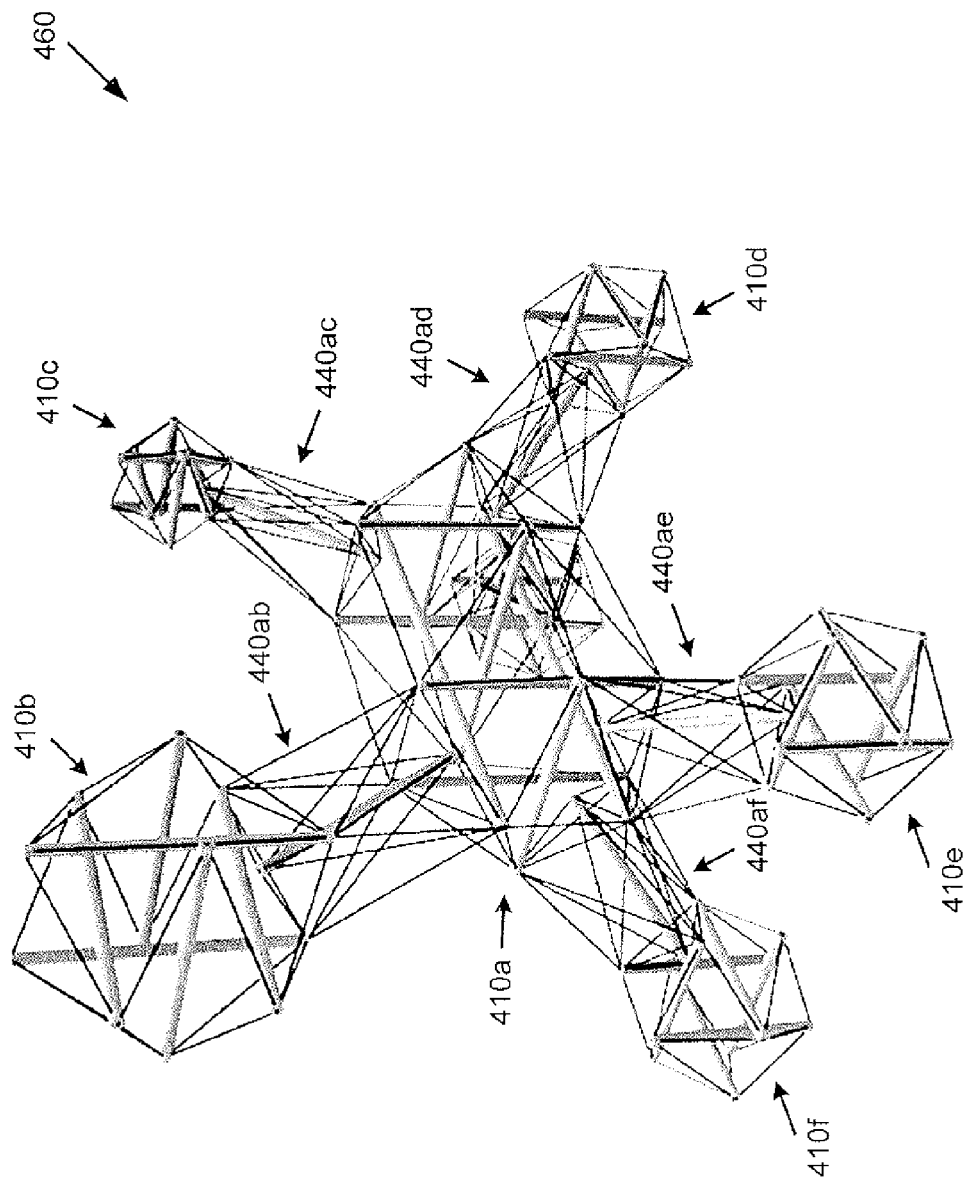
FIG. 4D depicts an exemplary complex tensegrity structure simulation generated by a tensegrity design system configured to perform modular design of complex tensegrity structures, according to one implementation.

The present inventive concepts will now be further described with reference to FIG. 3, and FIGS. 4A, 4B, 4C, and 4D (hereinafter "FIGS. 4A-4D"). FIG. 3 shows flowchart 300 presenting an exemplary method for use by a tensegrity design system to perform modular design of complex tensegrity structures, according to one implementation. FIGS. 4A-4D correspond to various stages of the method outlined by flowchart 300, in FIG. 3. For example, FIG. 4A shows exemplary building blocks 410 selectable by a user, such as user 142, to virtually assemble a complex tensegrity structure, while FIG. 4B depicts a stage of such a virtual assembly process. FIG. 4C shows exemplary connection types 440 for use in joining the exemplary building blocks shown in FIGS. 4A and 4B, and FIG. 4D depicts exemplary complex tensegrity structure 460 simulated by a tensegrity design system such as tensegrity design system 102. With respect to the method outlined in FIG. 3, it is noted that certain details and features have been left out of flowchart 300 in order not to obscure the discussion of the inventive features in the present application.

Referring to FIG. 3 in combination with FIGS. 1, 2, and 4A, flowchart 300 begins with providing virtual building blocks selectable by user 142 for use in assembly of a desired tensegrity structure (310). FIG. 4A shows example virtual building blocks 410, including building blocks 410-1, 410-2, 410-3, and 410-4, each of which is shown to be an elementary tensegrity structure conforming to the definition of a tensegrity and meeting the tensegrity constraint described above. Virtual building block 410-1 is shown as a four-fold or quadruplex tensegrity structure including a set of substantially rigid struts 412 configured to resist compressive and tensile forces, and a set of cables 414, which may be elastic or inelastic, configured to resist tensile forces but not compressive forces and coupling the substantially rigid struts 412.

In addition to virtual building block 410-1, FIG. 4A shows virtual building block 410-2 in the form of an icosahedron tensegrity structure also formed from substantially rigid struts 412 and cables 414, while building blocks 410-3 and 410-4 are shown as respective diamond and double icosahedron tensegrity structures analogously formed from substantially rigid struts 412 and cables 414. It is noted that although virtual building blocks 410-1, 410-2, 410-3, and 410-4 are shown as being formed from struts 412 and cables 414, more generally, virtual building blocks suitable for use according to the present inventive principles may include any group of structural elements including a first set of structural elements configured to resist compressive forces and tensile forces, and a second set of structural elements configured to resist tensile forces but not compressive forces. Virtual building blocks 410-1, 410-2, 410-3, and 410-4 may be provided to user 142 on design terminal 132/232 by tensegrity design system 102, using tensegrity design engine 112 or through use of tensegrity design engine instructions 222, and building blocks database 116/226.

In some implementations, the present method may include enabling modification of the shapes of one or more of the virtual building blocks selected by user 142 (320). In other words, tensegrity design engine 112 or tensegrity design engine instructions 222 may enable user 142 to modify the respective shapes of virtual building blocks 410 following their selection, and received such modifications.

For example, the absolute or relative lengths of struts 412 and cables 414 used to form virtual building blocks 410 may be modified by user 142 so as to scale or reshape virtual building blocks 410.

It is noted that although in some implementations user 142 may modify the shapes of virtual building blocks 410, their respective topologies remain unchanged. That is to say the number and nature of the structural elements used to form virtual building blocks 410-1, 410-2, 410-3, and 410-4, as well as the connections among those structural elements remain unchanged under the modifications enabled by tensegrity design engine 112 or tensegrity design engine instructions 222.

Flowchart 300 continues with enabling user determination of desired relative spatial positions and orientations of the virtual building blocks (330). Referring to FIGS. 1, 2, and 4B, FIG. 4B shows virtual building blocks 410 selectable by user 142, as well as arrangement 430 of building blocks 410a, 410b, 410c, 410d, and 410e (hereinafter "building blocks 410a-410e") selected by user 142 from among virtual building blocks 410. As shown by FIG. 4B, the relative spatial positions and orientations of building blocks 410a-410e have been determined by user 142 so as to represent the body (building block 410a), head (building block 410b), tail (building block 410c) and two feet or paws (building blocks 410d and 410e) of a complex tensegrity structure resembling a dog. Determination of the relative spatial positions and orientations of building blocks 410a-410e may be performed by tensegrity design engine 112 or through use of tensegrity design engine instructions 222, based on inputs to tensegrity design system 102 provided by user 142 via design terminal 132/232.

Flowchart 300 continues with identifying a connection for each pair of building blocks to be joined (340). Identification of such connections may be performed by tensegrity design engine 112 or through use of tensegrity design engine instructions 222, using connections database 114/224, and may be based on inputs from user 142 selecting pairs of building blocks to be joined. In some implementations, user 142 may simply select pairs of building blocks to be joined, and tensegrity design engine 112 or tensegrity design engine instructions 222 may be configured to identify a suitable connection for each pair based on the pairings selected by user 142, as well as the relative positions and orientations of the building blocks forming each pair. Thus, in one implementation, tensegrity design system 102 including tensegrity design engine 112, connections database 114, and building blocks database 116 can identify connections among the user-selected virtual building blocks, based on user inputs to the tensegrity design system provided through design terminal 132.

FIG. 4C shows two exemplary implementations of connection types 440 for joining virtual building blocks. As shown in FIG. 4C, building blocks 410a-1 and 410b-1 are connected by a first connection type included in connections database 114/224 and depicted as face connection 440-1. According to the exemplary implementation shown in FIG. 4C, face connection 440-1 utilizes twelve cables and a single strut to connect a triangular facet of building block 410a-1 to a facing triangular facet of building block 410b-1. It is noted that in order to enhance stability, in some implementations, the single strut of the face connection passes through the connecting triangular facet of each of building blocks 410a-1 and 410b-1, thereby extending into building blocks 410a-1 and 410b-1. By contrast, building blocks 410a-2 and 410b-2 are connected by a second connection type included in connections database 114/224 and depicted as edge connection 440-2. Edge connection 440-2 may be implemented, for example, by removing a cable from each of building blocks 410*a*-2 and 410*b*-2, and adding four struts and thirty-eight cables to complete edge connection 440-2.

Flowchart 300 continues with determining a network of forces required to stabilize a tensegrity structure corresponding to the desired tensegrity structure, based on the user-selected virtual building blocks and the connections among them (350). Determination of such a network of forces may be performed by tensegrity design engine 112 or through use of tensegrity design engine instructions 222 computationally, using an optimization process, such as an alternating optimization approach in which position and stress variables are optimized separately, for example.

Determination of the network of forces may include determining the tensile and compressive forces necessary to produce a zero net force at each connection node of the tensegrity structure when combined with an environmental force or forces, such as a gravitational force. In other words, in implementations in which a tensegrity structure is assembled from struts and cables and is designed to be stable under its own weight, the forces produced by the struts, cables, and gravity should sum to substantially zero at each point at which a strut connects to a cable, for example.

As noted above, in some instances, a desired tensegrity structure specified by user inputs may not represent a tensegrity structure capable of stability under its own weight. In those cases, tensegrity design engine 112 or tensegrity design engine instructions 222 may determine a network of forces required to stabilize a complex tensegrity structure deviating slightly from, but corresponding substantially to, the desired tensegrity structure specified by the user.

Flowchart 300 continues with generating a simulation of the tensegrity structure corresponding to the desired tensegrity structure for display to user 142 (360). Generation of the simulation may be performed by tensegrity design engine 112 or through use of tensegrity design engine instructions 222, utilizing the previously determined network of forces and the material properties of the structural elements used to assemble the tensegrity structure, for example. Those material properties may be included in one or both of connections database 114/224 and building blocks database 116/226.

For example, in implementations in which struts and elastic cables are utilized to assemble the tensegrity structure, the force to be produced by a particular cable at its connection points, as well as its elasticity, may be used to determine the required rest length of that cable. That is to say, the network of forces determined by tensegrity design engine 112 may be used to identify the parameters of the structural elements needed for assembly of the tensegrity structure, such as the lengths of struts and the rest lengths of cables.

Referring to FIG. 4D, FIG. 4D shows complex tensegrity structure 460, according to one implementation. Complex tensegrity structure 460 may be a simulation of the tensegrity structure corresponding to the desired tensegrity structure and described above. As shown in FIG. 4D, complex tensegrity structure 460 depicts a figure of a dog having body 410*a*, head 410*b*, tail tip 410*c*, and feet or paws 410*d*, 410*e*, and 410*f*. It is noted that a fourth foot or paw of complex tensegrity structure 460 is situated behind and obscured by body 410*a*. As further shown by FIG. 4D, connection 440*ab* connects head 410*b* to body 410*a* and thus serves as a neck of the dog figure represented by complex tensegrity structure 460. By analogy, connections 440*ad*, 440*ae*, and 440*af* connect respective feet or paws 410*d*, 410*e*, and 410*f* to body 410*a*, and thus serve as legs of the dog figure. Moreover, connection 440*ac* connects tail tip 410*c* to body 410*a* and forms part of the tail of the dog figure represented by complex tensegrity structure 460. According to the implementation shown in FIG. 4D, body 410*a*, head 410*h*, tail tip 410*c*, and feet or paws 410*d*, 410*e*, and 410*f* are provided by elementary tensegrity structures in the form of virtual building blocks 410 depicted in FIGS. 4A and 4B and stored in building blocks database 116/226. In addition, connections 440*ab*, 440*ac*, 440*ad*, 440*ae*, and 440*ae* are provided by connections such as connections 440, in FIG. 4C, which are stored in connections database 114/224.

In some implementations, complex tensegrity structure 460 may be compliant. In other words, the elasticity of the cables or other structural elements configured to resist tensile forces but not compressive forces may determine the overall stiffness of complex tensegrity structure 460. Moreover, and as noted above, in some implementations, the simulation generated by tensegrity design engine 112 or through use of tensegrity design engine instructions 222 may be interactive, and may enable user 142 to perform a virtual use of complex tensegrity structure 460, thereby testing its stiffness or compliance. In those implementations, the exemplary method outlined by flowchart 300 may further include adjusting the stiffness or compliance of complex tensegrity structure 460 based on one or more inputs from user 142 after its virtual use by user 142.

Thus, the present application discloses an improved design solution that adopts a modular approach using virtual building blocks, which may themselves be elementary tensegrity structures, to enable the design of complex tensegrity structures. As described above, the present solution may be substantially automated through use of a tensegrity design engine or instructions for instantiating such a tensegrity design engine. As a result, some implementations advantageously enable a non-expert user, such as an artist, landscape designer, or consumer, for example, to design relatively complex tensegrity structures capable of supporting their own weight.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a tensegrity design system including a processor, the method comprising:
   providing, using the processor, a plurality of virtual building blocks selectable by a user for assembly of a desired tensegrity structure;
   receiving, using the processor, user-selected building blocks from among the plurality of virtual building blocks from the user;
   identifying, using the processor, connections among the user-selected building blocks, based on user inputs to the tensegrity design system;
   determining, using the processor, a network of forces for stabilizing a tensegrity structure corresponding to the desired tensegrity structure, based on the user-selected building blocks and the connections; and generating, using the processor, a simulation of the tensegrity structure corresponding to the desired tensegrity structure for display to the user.

2. The method of claim 1, wherein each of the plurality of virtual building blocks comprises an elementary tensegrity structure.

3. The method of claim 1, wherein each of the plurality of virtual building blocks comprises another plurality of structural elements including a first set of structural elements configured to resist compressive forces and tensile forces, and a second set of structural elements configured to resist tensile forces but not compressive forces.

4. The method of claim 1, wherein each of the plurality of virtual building blocks comprises substantially rigid struts and one of elastic and inelastic cables coupling the substantially rigid struts.

5. The method of claim 4, further comprising utilizing the network of forces to determine lengths of the substantially rigid struts, and rest lengths of the cables.

6. The method of claim 1, wherein the connections among the user-selected building blocks include at least one of face connections and edge connections.

7. The method of claim 1, further comprising enabling the user to modify the respective shapes of the user-selected building blocks.

8. The method of claim 1, wherein the simulation of the tensegrity structure generated by the tensegrity design system is an interactive simulation enabling a virtual use of the tensegrity structure by the user.

9. The method of claim 1, further adjusting a stiffness of the tensegrity structure generated by the tensegrity design system based on a user input.

10. A tensegrity design system comprising:
a processor and a memory;
a tensegrity design engine stored in the memory, the tensegrity design engine, under control of the processor, configured to:
provide a plurality of virtual building blocks selectable by a user for assembly of a desired tensegrity structure;
receive user-selected building blocks from among the plurality of virtual building blocks from the user;
identify connections among the user-selected building blocks, based on user inputs to the tensegrity design system;
determine a network of forces for stabilizing a tensegrity structure corresponding to the desired tensegrity structure, based on the user-selected building blocks and the connections; and
generate a simulation of the tensegrity structure corresponding to the desired tensegrity structure for display to the user.

11. The tensegrity design system of claim 10, further comprising a building blocks database including the plurality of virtual building blocks selectable by the user.

12. The tensegrity design system of claim 10, wherein each of the plurality of virtual building blocks comprises an elementary tensegrity structure.

13. The tensegrity design system of claim 10, wherein each of the plurality of virtual building blocks comprises another plurality of structural elements including a first set of structural elements configured to resist compressive forces and tensile forces, and a second set of structural elements configured to resist tensile forces but not compressive forces.

14. The tensegrity design system of claim 13, wherein the tensegrity design engine is further configured to utilize the network of forces to determine lengths of the structural elements configured to resist compressive forces and tensile forces, and rest lengths of the structural elements configured to resist tensile forces but not compressive forces.

15. The tensegrity design system of claim 10, further comprising a connections database including at least a first connection type and a second connection type for joining the virtual building blocks.

16. The tensegrity design system of claim 15, wherein the first connection type is a face connection and the second connection type is an edge connection.

17. The tensegrity design system of claim 10, wherein the tensegrity design engine is further configured to enable the user to modify the respective shapes of the user-selected building blocks.

18. The tensegrity design system of claim 10, wherein the tensegrity design engine is further configured to adjust a stiffness of the tensegrity structure based on a user input.

19. A computer-readable medium having stored thereon instructions which, when executed by a processor, instantiate a tensegrity design engine configured to:
provide a plurality of virtual building blocks selectable by a user for assembly of a desired tensegrity structure;
receive user-selected building blocks from among the plurality of virtual building blocks from the user;
identify connections among the user-selected building blocks, based on user inputs to the tensegrity design system;
determine a network of forces for stabilizing a tensegrity structure corresponding to the desired tensegrity structure, based on the user-selected building blocks and the connections; and
generate a simulation of the tensegrity structure corresponding to the desired tensegrity structure for display to the user.

20. The computer-readable medium of claim 19, further having stored thereon a building blocks database including the plurality of virtual building blocks selectable by the user.

21. The computer-readable medium of claim 19, wherein each of the plurality of virtual building blocks comprises an elementary tensegrity structure.

22. The computer-readable medium of claim 19, further having stored thereon a connections database including at least a first connection type and a second connection type for joining the virtual building blocks.

23. The computer-readable medium of claim 22, wherein the first connection type is a face connection and the second connection type is an edge connection.

24. The computer-readable medium of claim 19, wherein the tensegrity design engine is further configured to enable the user to modify the respective shapes of the user-selected building blocks.

25. The computer-readable medium of claim 19, wherein the tensegrity design engine is further configured to adjust a stiffness of the tensegrity structure based on a user input.

* * * * *